(12) United States Patent
Murata

(10) Patent No.: US 6,932,926 B2
(45) Date of Patent: Aug. 23, 2005

(54) METHOD AND APPARATUS FOR PRODUCING RESIN FORMED ARTICLE

(75) Inventor: Noboru Murata, Yokohama (JP)

(73) Assignee: Suneast Research Ltd, Yamanashi (JP)

( * ) Notice: Subject to any disclaimer, the term of this patent is extended or adjusted under 35 U.S.C. 154(b) by 316 days.

(21) Appl. No.: 10/181,266

(22) PCT Filed: Nov. 20, 2001

(86) PCT No.: PCT/JP01/10142

§ 371 (c)(1),
(2), (4) Date: Jul. 16, 2002

(87) PCT Pub. No.: WO02/40241

PCT Pub. Date: May 23, 2002

(65) Prior Publication Data

US 2003/0001302 A1 Jan. 2, 2003

(30) Foreign Application Priority Data

Nov. 20, 2000 (JP) ........................................ 2000-396263

(51) Int. Cl.$^7$ ............................................. B29C 44/24
(52) U.S. Cl. .................... 264/45.9; 264/45.8; 264/46.4; 264/177.16; 264/259; 264/296
(58) Field of Search ............................. 264/177.16, 296, 264/45.8, 45.9, 46.4, 259; 425/4 C, 112, 113

(56) References Cited

U.S. PATENT DOCUMENTS

| | | | | |
|---|---|---|---|---|
| 4,043,739 A | * | 8/1977 | Appel | 425/461 |
| 4,687,137 A | * | 8/1987 | Boger et al. | 239/124 |
| 4,731,004 A | * | 3/1988 | Wenz, Jr. | 425/133.5 |
| 4,990,293 A | * | 2/1991 | Macosko et al. | 264/40.1 |
| 5,310,513 A | * | 5/1994 | Yamamoto et al. | 264/54 |
| 5,750,159 A | * | 5/1998 | Delmore et al. | 425/190 |

* cited by examiner

Primary Examiner—Allan R. Kuhns

(57) ABSTRACT

The object of the present invention is to produce plural resin forms at one time with stability by dividing resin starting material continuously in a short time and with the same residence time into plural parts having desired amounts of resin and discharging to solidify them. The producing method is comprising, providing a liquid partition on the die land and/or die lip of a coat hanger shaped die along with the flow direction, introducing starting material for resin into said coat hanger shaped die and dividing it into plural parts and then discharging and solidifying on the adherent.

13 Claims, 9 Drawing Sheets

Figure 3:
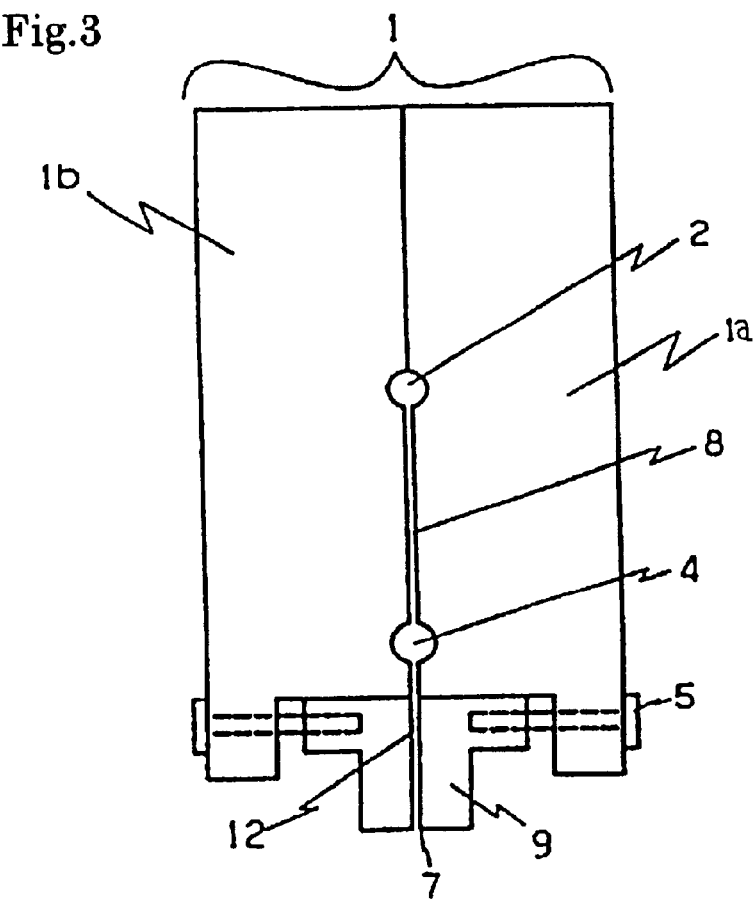

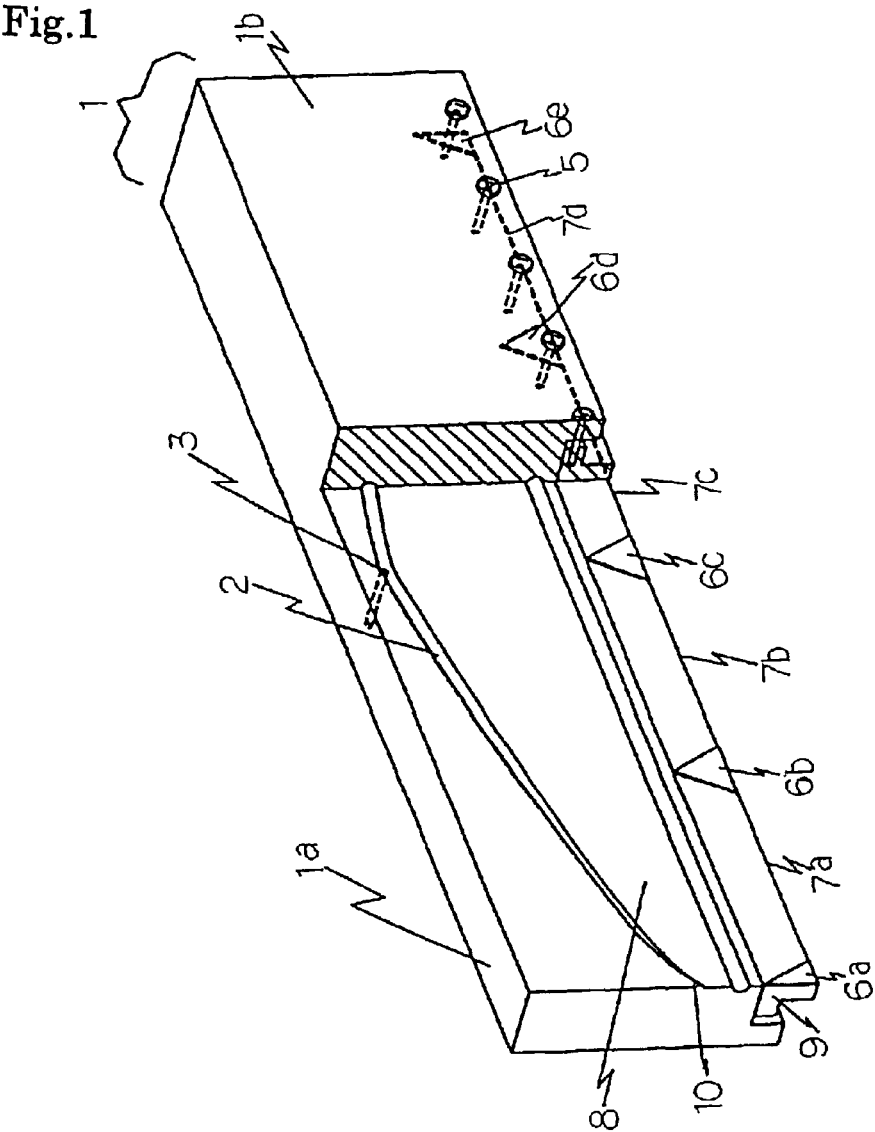
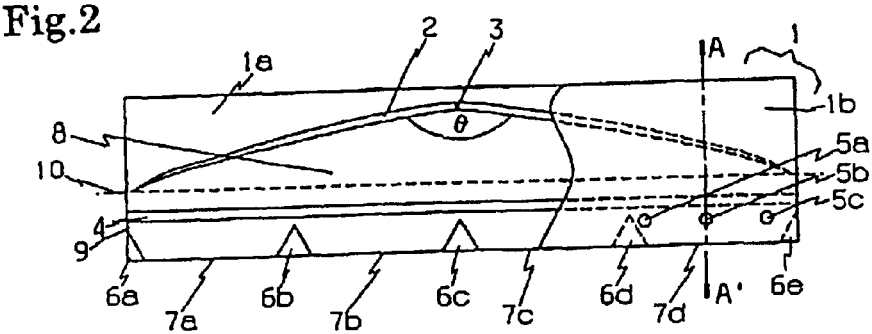

Fig.5
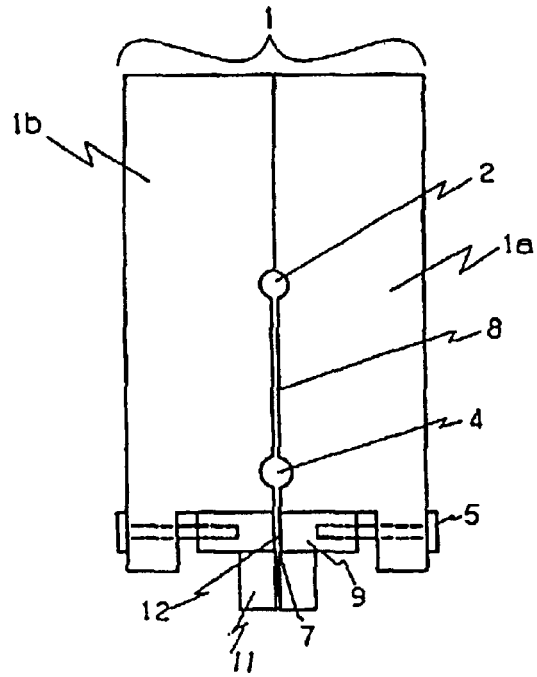
Fig.6
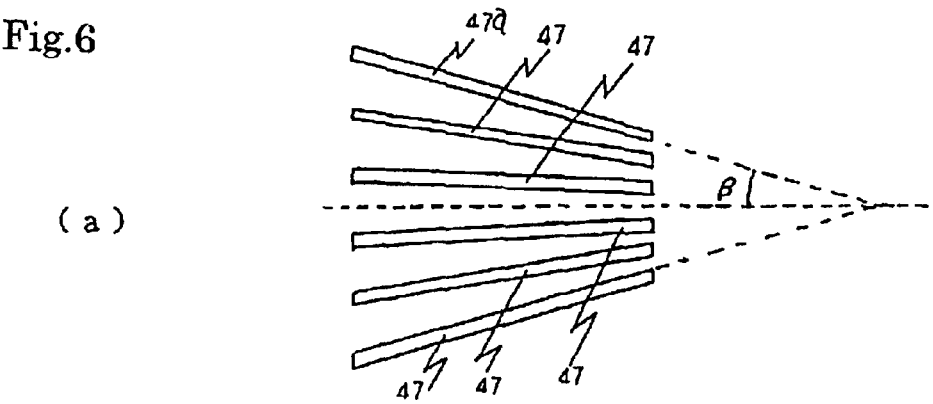
(a)
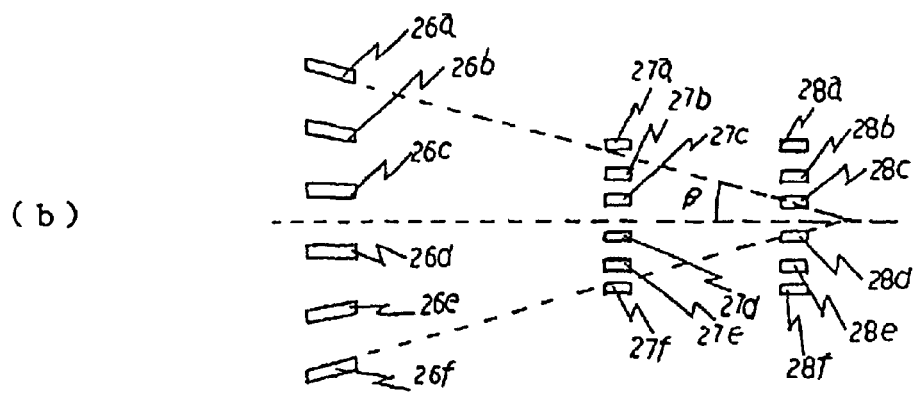
(b)

Fig.12
(a) 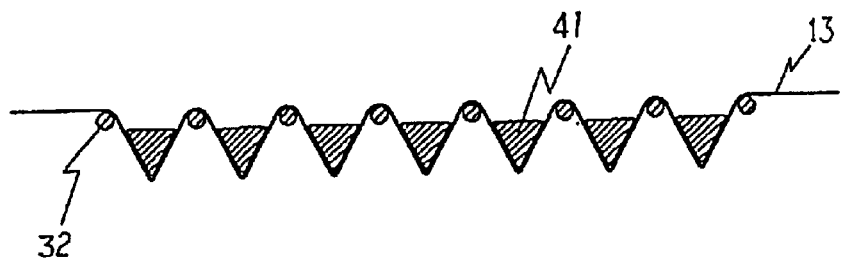
(b) 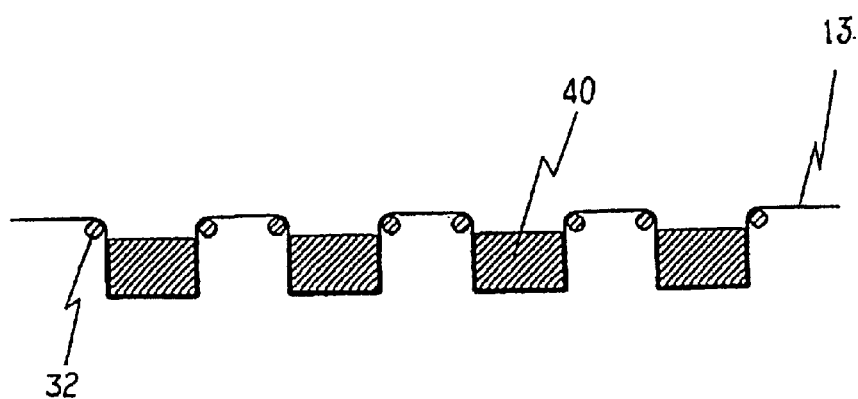
(c) 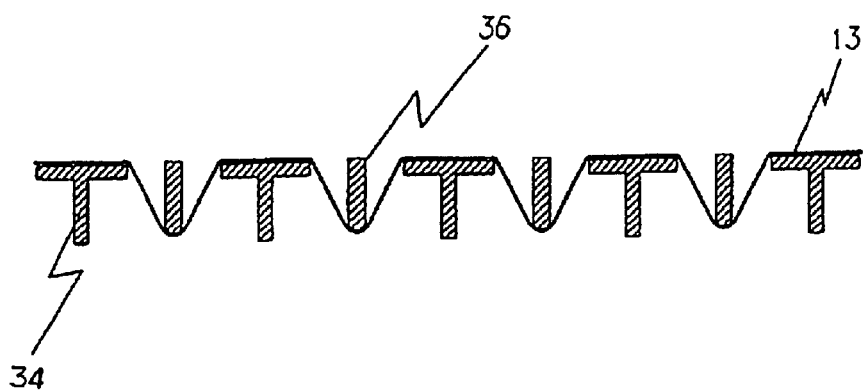
(d) 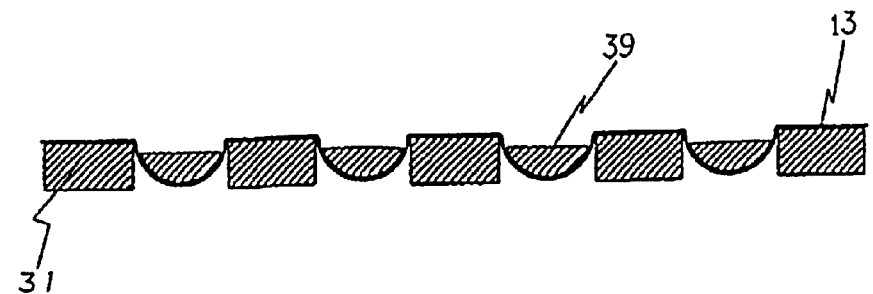

METHOD AND APPARATUS FOR PRODUCING RESIN FORMED ARTICLE

FIELD OF THE INVENTION

The present invention relates to a method for producing plural resin forms at one time comprising, dividing the starting material for resin (resin material) which is in liquid state or semisolid state to plural parts continuously, then extruding and solidifying said each divided resin material by using a specific apparatus. More in detail, the present invention relates to the producing method of resin form characterizing; the residence time of the resin material from an inlet to an outlet can be set up to extremely short time and almost same, further the extruded amounts from all outlets can be set up to almost same; or the residence time of the resin material from an inlet to an outlet are set up to almost same and the extruded amounts from all outlets can be voluntarily adjusted to the desired level, after that the divided liquid is extruded and solidified on an adherend. Further, the present invention relates to the apparatus to produce said resin form. Still further the present invention relates to a method and an apparatus for producing plural resin forms in which the divided resin material does not solidify in said apparatus during the production process even if the reactive resin material is used.

BACKGROUND OF THE INVENTION

For the conventional method to produce at one time and continuously the plural resin forms, it is necessary to prepare plural extruding apparatuses for extruding the resin material, therefore the cost for apparatus becomes extremely high. And in general, the extruded reactive or not reactive resin material which is in liquid state or semisolid state becomes resin form by heat treatment using a heating furnace after extruded.

In this case, when the extruded amount and mixing condition of each starting materials are same condition, the plural products having uniform quality can be obtained by using same heat treatment condition of the same heating furnace. However, if the extruded amount and mixing conditions are different, the qualities of obtained products become uneven.

For example, conventionally, a rope shaped chloroprene-rubber foam or EPDM rubber foam is produced by being extruded from a single shaft type rubber extruder to the horizontal direction and then heat set.

At the point when these products are extruded from an extruder, since these products have sufficient viscoelasiticity, the form retaining ability of these products are good. Therefore, in cases of these products, the products form and retain circular shape or modified cross-sectional shape only by extruded on a conveyor belt and it is possible to produce the foamed product of circular shape or modified cross-sectional shape by heat foaming.

Said these rope shaped rubber foam products are extruded by a single shaft type rubber extruder, and the number of extruding strings are restricted to one or two.

When more than 2 rope shaped products are extruded, it is necessary to extrude products of same size by same speed, because said products are extruded and foamed on a belt without using a mold. Thus, the plural products of same size can be formed on one belt. However, the upper limit of number of strings by said extruding method is 2, because the amount of each divided liquid is balanced by fine pressure balance, and in cases when the number of strings are more than 3, it is difficult to extrude products by same conditions e.g. same speed and same size.

And, even if more than 3 strings of rubber products can be extruded by same speed and same size using plural extruders, it is substantially difficult to obtain rope shaped rubber foams of same size in the subsequent heat foaming process, because the blending and extruding conditions of each extruder are delicately different.

According to the ground mentioned above, although the rope shaped rubber foam has excellent features, the productivity of it is very poor and the production cost is very high, therefore the application of it is limited.

Further, the production of resin form such as thermosetting polyurethane resin, phenol resin and reactive silicone resin or foamed product thereof from resin materials directly by the same process as to rubber foam using an extruder is difficult, because the viscoelasiticity of these resins are too small to retain their shape.

In the case to produce plural resin forms at one time from reactive resin materials e.g. above mentioned polyurethane resin using plural mixing machines, it is necessary that all conditions of extruded reactive resin material are same. However, since these conditions are delicately different from each other, it is not only difficult to produce plural resin forms of same quality by same apparatus but also the expenses for equipment is remarkably high. In the meanwhile, the foaming resin material having lower viscoelasiticity can be easily molded to the rope shaped by using a mold made of metal or resin, however, not only a foam of longer size can not be obtained but also the productivity is low and the product becomes very expensive.

Accordingly, the technique to produce plural resin forms at one time and continuously using various kind of starting materials, which have variations from lower viscoelasiticity to higher viscoelasiticity and from reactive resin material to non-reactive resin material has been strongly desired.

The present invention is carried out to dissolve the above mentioned problem, and the present invention is to provide an apparatus which divides starting material for resin which is in liquid state or semisolid state to plural number continuously and the time necessary for dividing is extremely short, the residence time of the resin materials from an inlet to an outlet of each divided part are same, further the divided amount of liquid of each divided parts are same or voluntarily adjustable. That is, the object of the present invention is to provide a method for production of resin form by dividing and extruding resin material continuously using above mentioned apparatus. Further, another object of the present invention is to provide an apparatus for production.

Furthermore, the present invention provides a method and an apparatus which is possible to produce plural resin forms at one time and continuously for long time even if a reactive resin material is used. Namely, peculiarity of the present invention is that, even if the number of dividing parts are from several to tens, the residing time in all divided parts are equal, that is, the residence times from the starting point of dividing to the end point of dividing of each parts of the dividing apparatus are almost equal and extremely short.

DISCLOSURE OF THE INVENTION

The object of the present invention is to provide a method and an apparatus which is possible to make the residence times from the inlet of the material to the all outlets of the divided liquids short and almost equal, further make the discharge amount from all outlets equal or voluntarily adjustable, and the inventors of the present invention have conduced intensive study and found that said object can be performed by arranging a partition device for liquid in back of the die land of the coat hanger type die. That is, the starting material for resin (resin material) of liquid or semi-solid state is introduced into the dividing apparatus of the present invention then the divided liquids are discharged and solidified, thus the plural resin forms can be stably produced at one time. Further, the inventors of the present invention have found that the residence time can be made equal and the discharge amount from each outlets of divided liquids can be voluntarily adjusted by altering the dividing gap of the partition device and the width of each outlet of divided liquid. Thus the plural resin forms of different discharging amount can be stably produced at one time, and the inventors of the present invention have accomplished the present invention.

By the present invention, several to tens resin forms can be at one time produced in series.

BRIEF ILLUSTRATION OF THE DRAWINGS

Figure 4:
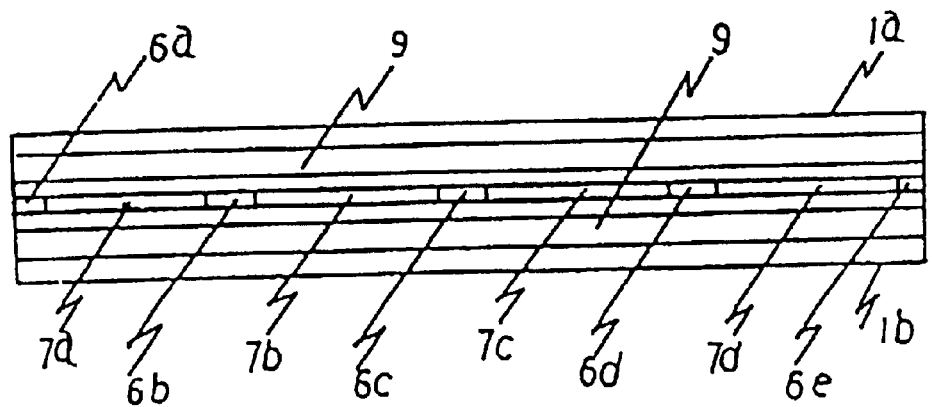
Figure 7:
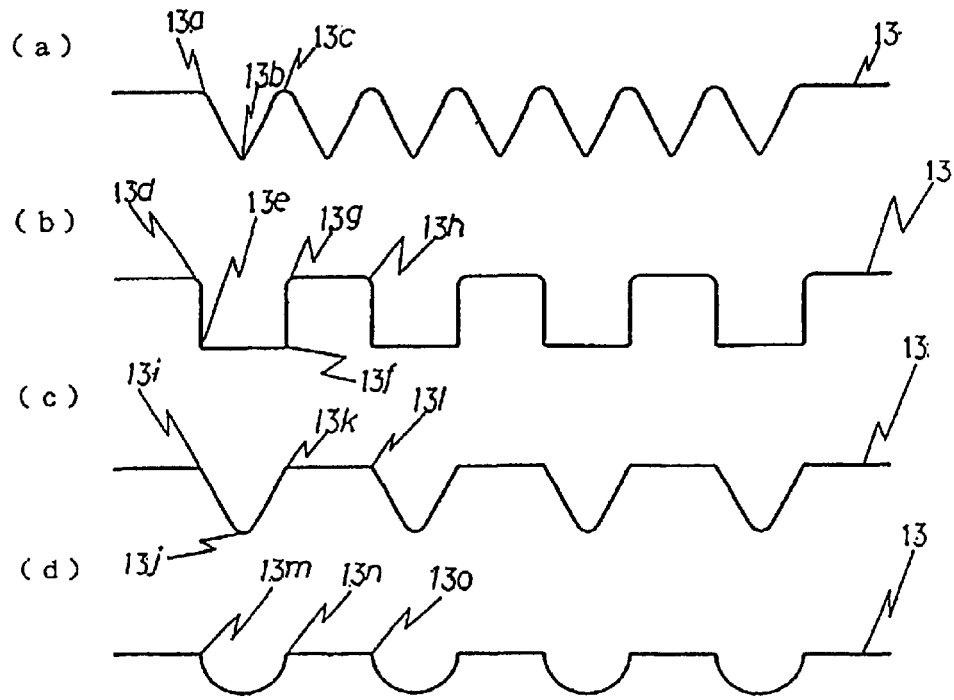
Figure 8:
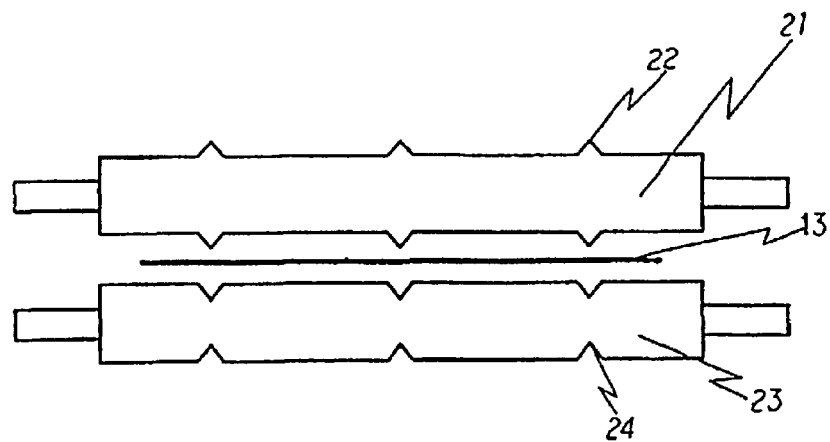
Figure 9:
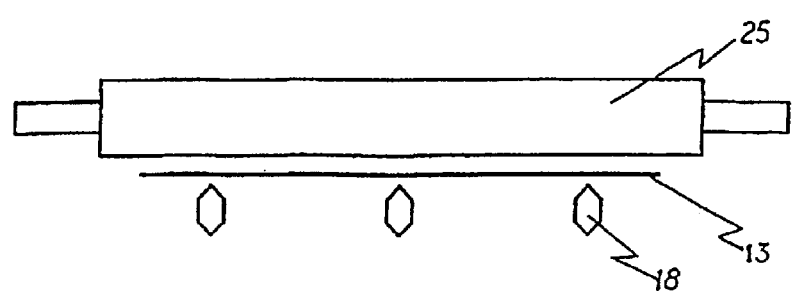
Figure 10:
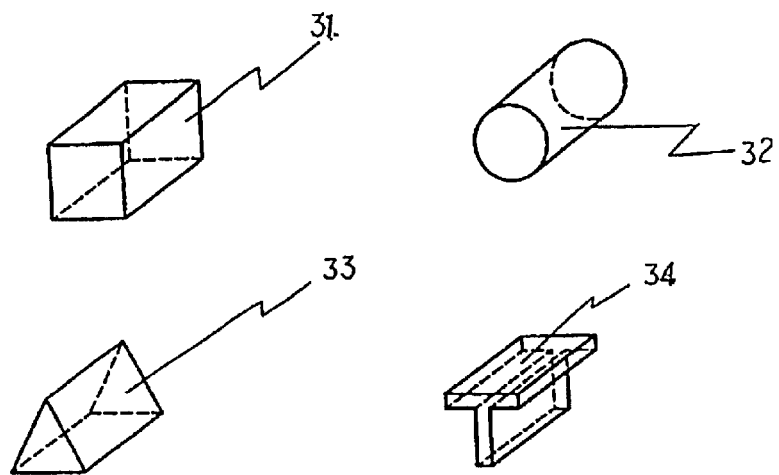
Figure 11:
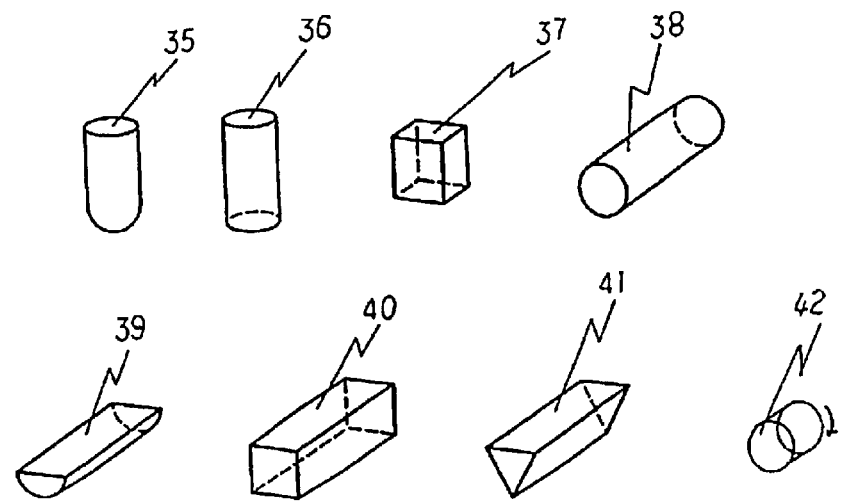
Figure 13:
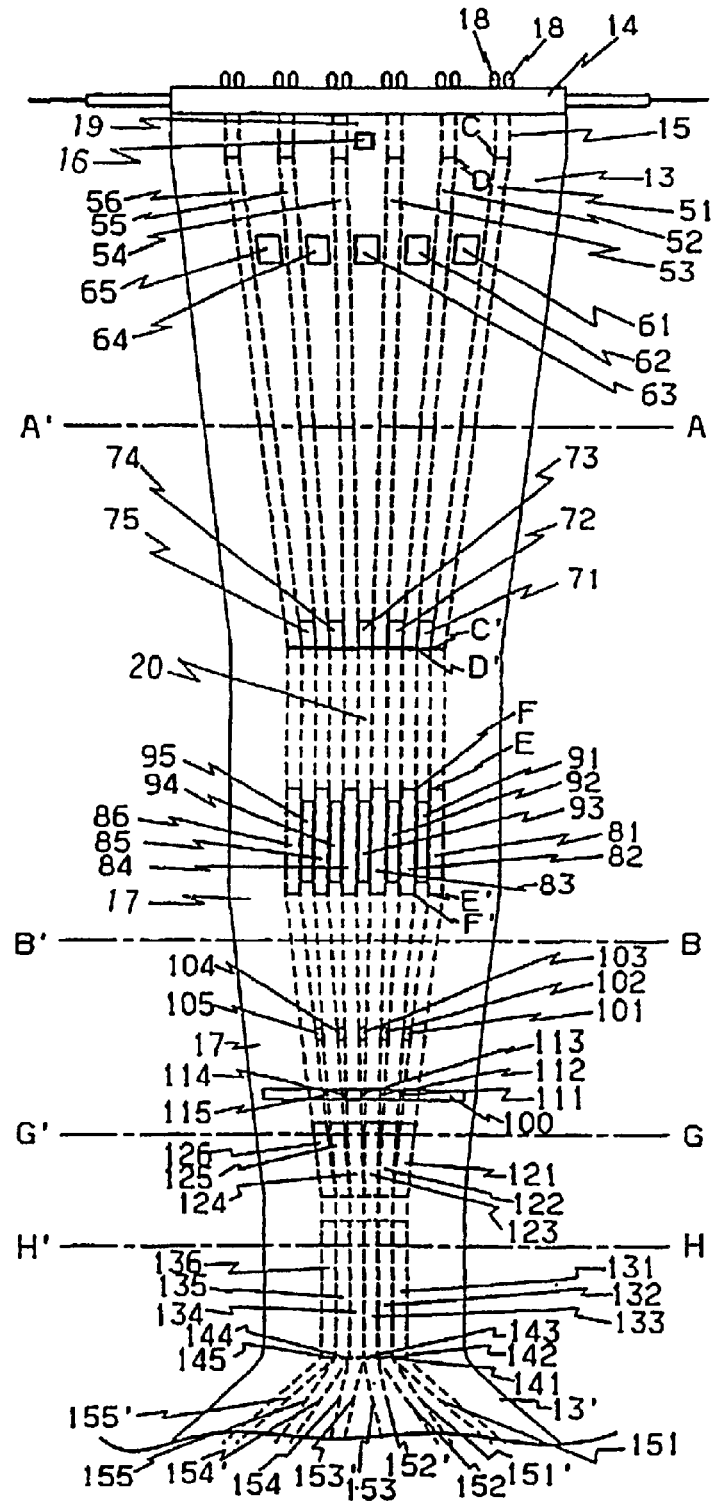
Figure 14:
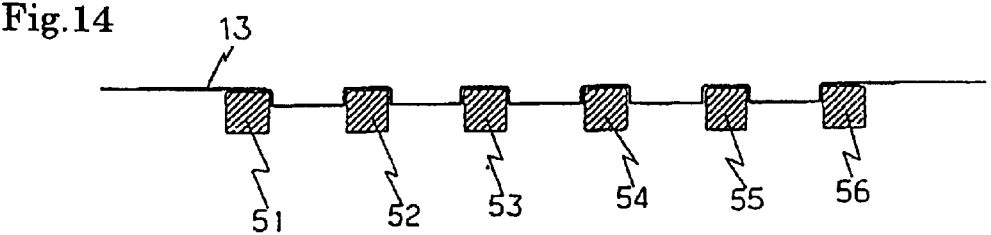
Figure 15:
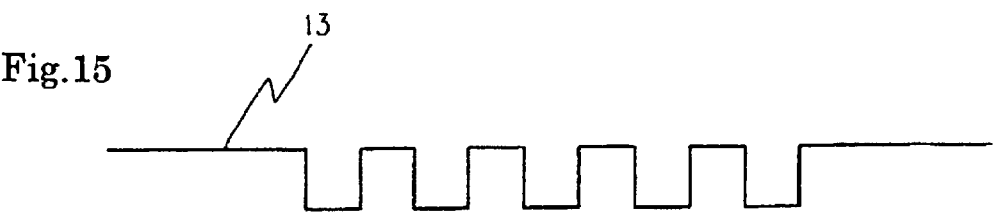
Figure 16:
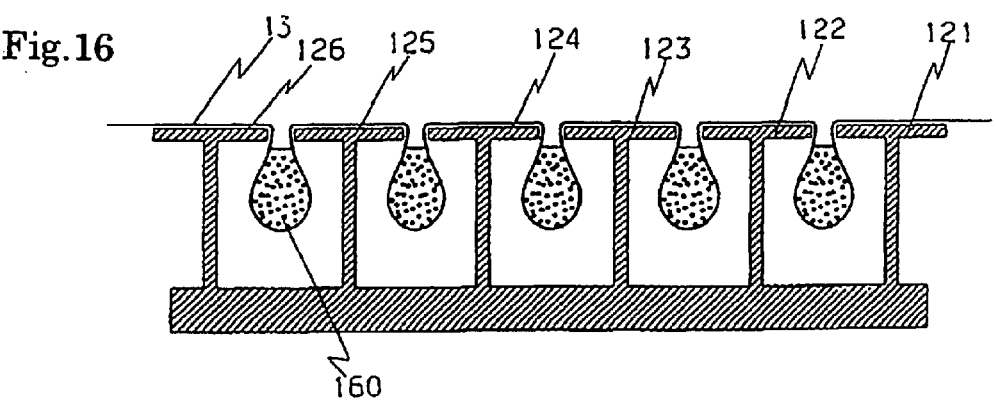
Figure 17:
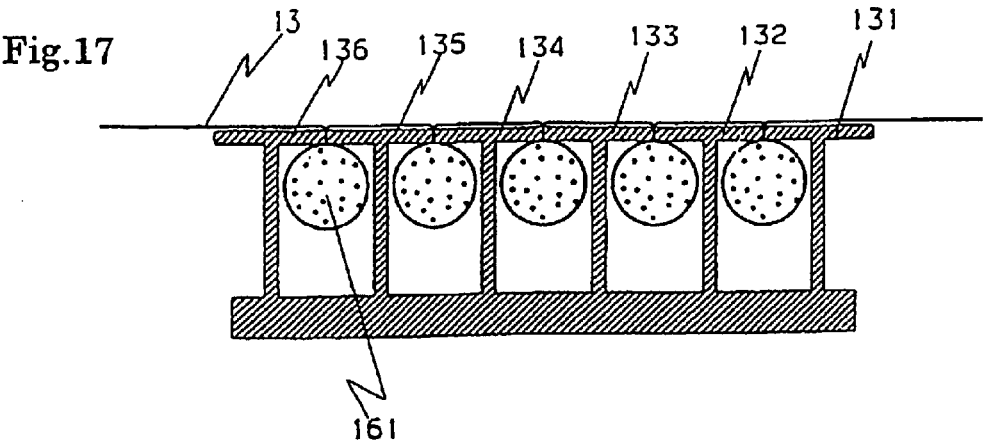
Figure 18:
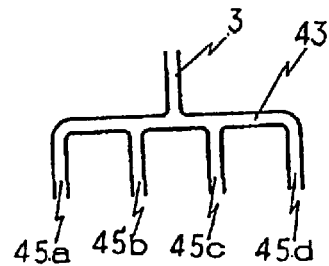
Figure 19:
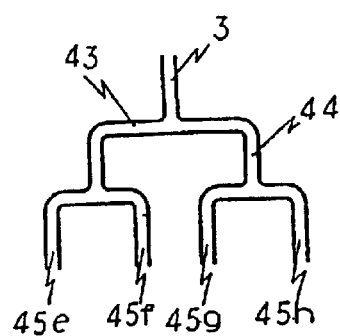
Figure 20:
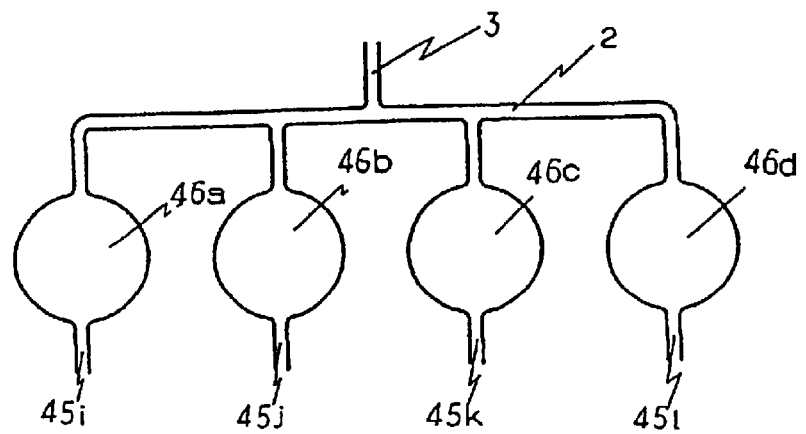

FIG. 1 is the perspective view of one example of the liquid dividing apparatus of the present invention, FIG. 2 is the front view of the liquid dividing apparatus of the present invention, FIG. 3 is the A–A' line cross sectional view of the liquid dividing apparatus of the present invention, FIG. 4 is the bottom view of the liquid dividing apparatus of the present invention, FIG. 5 is the cross sectional view of another example of the liquid dividing apparatus of the present invention, FIG. 6 is the front view to regulate the opening angle of a radial forming guide of the present invention, FIG. 7 is the cross sectional view showing the structural feature of sheet having groove shaped forms used at the production process for rope shaped resin form of the present invention, FIG. 8 is the cross sectional view of the device to mark the folding line, FIG. 9 is the cross sectional view of the device to mark perforation folding line, FIG. 10 is the perspective view of the radial forming guide used in the present invention, FIG. 11 is the perspective view of the pressing device which presses the space between radial forming guides used in the present invention, FIG. 12 is the cross sectional view showing the relationship between radial forming guides and pressing device which are used in the present invention, FIG. 13 is the plane view showing the process to prepare the sheet having plural groove shaped forms of the present invention and showing the process to pour resin material into said groove shaped form and to solidify so as to obtain the product, FIG. 14 is the A–A' line cross sectional view of FIG. 13, FIG. 15 is the B–B' line cross sectional view of FIG. 13, FIG. 16 is the G–G' line cross sectional view of FIG. 13, FIG. 17 is the H–H' line cross sectional view of FIG. 13, FIG. 18 is the cross sectional view of vertical direction of the conventional liquid dividing apparatus, FIG. 19 is the cross sectional view of vertical direction of another conventional liquid dividing apparatus and FIG. 20 is the cross sectional view of vertical direction of the other conventional liquid dividing apparatus.

Further, in the drawings,
1: liquid dividing apparatus of the present invention,
1$a$, 1$b$: die board of liquid dividing apparatus of the present invention,
2: manifold,
3: inlet for resin material,
4: pressure control groove,
5: die lip gap adjusting bolt,
6: partition device for liquid
6$a$, 6$b$, 6$c$, 6$d$, 6$e$: partition device for liquid
7: outlet of die lip
7$a$, 7$b$, 7$c$, 7$d$, 7$e$: outlet of die divided liquid
8: die land
9: die lip
10: division line of die land and die lip
11: liquid dividing unit
12: die lip gap
13: sheet substrate
13$a$, 13$b$, 13$c$, 13$d$, 13$e$, 13$f$, 13$g$, 13$h$, 13$i$, 13$j$, 13$k$, 13$l$, 13$m$, 13$n$, 13$o$: folding line
13': sheet substrate which are peeling
14: feed roll
15: folding line
16: press roll for open space
17: sheet substrate composed of groove shaped form.
18: perforation line cutter
19: open space in front of radial forming guide
20: open space between $1^{st}$ radial forming guide and $1^{st}$ parallel guide
21: roll with male projection
22: male projection
23: roll with female groove
24: female groove
25: roll
26$a$, 26$b$, 26$c$, 26$d$, 26$e$, 26$f$: fixed object
27$a$, 27$b$, 27$c$, 27$d$, 27$e$, 27$f$ parallel guide
28$a$, 28$b$, 28$c$, 28$d$, 28$e$, 28$f$ parallel guide
31: radial forming guide
32: other radial forming guide
33: other radial forming guide
34: other radial forming guide
35: pressing device
36, 37, 38, 39, 40, 41, 42: other pressing device
43: liquid dividing pipe
44: liquid dividing pipe
45$a$, 45$b$, 45$c$, 45$d$, 45$e$, 45$f$, 45$g$, 45$h$, 45$i$, 45$j$, 45$k$, 45$l$: outlet of divided liquid
46$a$, 46$b$, 46$c$, 46$d$: measuring pump
47$a$, 47$b$, 47$c$, 47$d$, 47$e$, 47$f$: radial guide
51, 52, 53, 54, 55, 56: $1^{st}$ radial forming guide
61, 62, 63, 64, 65: $1^{st}$ pressing device
71, 72, 73, 74, 75: $2^{nd}$ pressing guide
81, 82, 83, 84, 85, 86: $1^{st}$ parallel guide
91, 92, 93, 94, 95: $3^{rd}$ pressing device
100: liquid dividing apparatus of the present invention
101, 102, 103, 104, 105: $4^{th}$ pressing device
111, 112, 113, 114, 115: outlet of divided liquid of the liquid dividing apparatus of the present invention
121, 122, 123, 124, 125, 126: upper closing guide of groove shaped subject
131, 132, 133, 134, 135, 136: cure guide of groove shaped subject
141, 142, 143, 144, 145: closing part of groove shaped subject
151, 151', 152, 152', 153, 153', 154, 154', 155, 155': releasing line of sheet substrate
161: product

THE BEST EMBODIMENT TO CARRY OUT THE INVENTION

FIG. 1 is the perspective view of the liquid dividing apparatus of the present invention, FIG. 2 is the front view of it, FIG. 3 is the A–A' line cross sectional view of FIG. 2 and FIG. 4 is the bottom view of the liquid dividing apparatus of the present invention of FIG. 1.

In FIG. 1, FIG. 2 and FIG. 3, the liquid dividing apparatus of the present invention 1 is consisting of two die boards 1a and 1b, 3 is an inlet for resin material, 4 is a pressure control groove which control the inner pressure of die constant, 5 is a die lip gap adjusting bolt, 6 is a partition device for liquid, 7 is an outlet of each die lip, 8 is a die land, 9 is a die lip and 10 is an indication line showing next to the manifold. The partition devices for liquid 6a, 6b, 6c, 6d, 6e of the present invention are placed along with the flow direction backward the die land of the coat hanger type die, and divide the liquid which is flue forming film or plate shape by same speed and parallel. Said partition device for liquid is placed along with the liquid flowing direction of the liquid dividing apparatus 1 of the present invention so as to reduce the flow resistance, concretely it is placed at the center of the manifold 2. Namely, said partition device for liquid can be placed on die land 8 and on die lip 9 parallel with the line connecting the liquid inlet 3 which is center of manifold 2 and outlet 7 of the liquid dividing apparatus 1 of the present invention at the closest point. Further, it is desirable that said partition device is placed behind the indication line 10, which shows next to the manifold, and furthermore desirable to be placed at the die lip 9 which locates behind the both end positions of the manifold. In the present invention, the die land is represented by 8 of FIGS. 1 and 2. This partition device for liquid is placed to accomplish the following function. Namely, the starting material is introduced from an liquid inlet 3 using a coat hanger type die, spread thinly, then is formed to a thin film or sheet which flows by constant quantity and constant speed covering full width of a die next to the die land, and is divided. The shape of the starting material to be used can be thin plate shape, block shape or triangle shape shown in FIG. 1 or FIG. 2, however, not limited to these shapes. Any kind of shape which can divide the liquid completely can be used. It is desirable that the center line of partition device for liquid flowing direction is nearly parallel to the die flow direction. That is, it is very important to design the partition device not to leave liquid in it. Further, as shown in FIGS. 1, 2 and 3, these partition devices for liquid can be one body structure which is installed in the main body of the liquid dividing apparatus 1 of the present invention. Or, as shown in liquid dividing unit 11 of FIG. 5, the partition device can be prepared separately from the main body and used with contacting to the outlet 7, or the partition device can be used by keeping adequate distance from the main body of the liquid dividing apparatus 1 of the present invention and divide the liquid which flows out like a curtain from the outlet of die. In the case when the partition device is one body with the main body or used in contact with the main body, since the dead angle toward the liquid flowing direction is not formed, the problem that the liquid is solidified in the inside of die does not occur even if the liquid is a reactive resin material.

Further, in the case when the partition device for liquid is separated from the main body, it is not necessary to overhaul the apparatus at the changing of the dividing number of liquid. Therefore, this type has a merit to reduce the arrangement process. The coat hanger shaped die of the present invention is the die having shape shown in FIGS. 1, 2, 3 and 4. In general, this coat hanger shaped die is consisting of an liquid inlet 3, a manifold 2 which extends liquid to the width direction, a die land 8 at which liquid flows parallel to the toward the outlet, a die lip 9 at which is rectified liquid flow so as the residence time from the inlet and the flowing quantity of the extended liquid to be uniform toward the die width direction, a die lip gap adjusting bolt 5 which finely adjust the opening of die gap 12 and a groove 4 which control the flow of liquid uniform if necessary.

Said groove 4 is set up to make the flowing quantity of the width direction uniform, however it is not always necessary.

The liquid dividing apparatus of the present invention is consisting of a coat hanger shaped die and a dividing device, and is designed so that the opening angle β of manifold at the inlet for starting material is from 115 to 170 degree (FIG. 2). And the ratio of the inner volume of die except manifold and the inner volume of manifold is set up to be from 1:0.1 to 1:10, desirably from 1:0.2 to 1:5.

When the ratio of the inner volume of die except manifold to the inner volume of manifold is bigger than above mentioned range, the residing time of outermost side part of die becomes several to tens times to the average residing time. In this case, if the liquid is reactive, liquid at outermost side part of die reacts in inside of the die. And on the contrary, when said ratio is smaller than above mentioned range, the flow speed of center part of die land becomes slow, namely residing time becomes long, and liquid at center part becomes easily to react.

Further, when the opening angle of manifold is out of the limit of from 115 to 170 degree, the part of long residing time is generated in this dividing apparatus, consequently this dividing apparatus can not endure to the long time use.

In FIG. 2, the resin material is introduced from the liquid inlet 3, passed through manifold 2 and spread to the width direction of the die, then at the die land 8 the liquid flows as the arranged flow. The shape of manifold, opening angle θ and the die lip gap 12 are set up so as the residing time from the liquid inlet 3 on the width direction of die and the flowing quantity of the resin material to be almost equal at any point on width direction on the point of die lip 9.

The resin material that passed through the die land 8 is divided at die lip 9 by the partition devices 6a, 6b, 6c, 6d and 6e and flown to the outlets of die divided liquid 7a, 7b, 7c and 7d.

When it is necessary to make the quantity of each divided liquid equal, the gap of each partition device should be same, and when it is necessary to make the quantity of liquid flow of one divided liquid two times to another one divided liquid, it is possible to make the distance of the corresponding partition device double.

The partition devices for liquid in the method and apparatus of the present invention should be designed to minimize the flow resistance and not to make dead angle. Regarding to die lip 9, die lip gap 12 can be finely adjusted by a die lip gap adjusting bolt 5 so as to finely adjust the flowing quantity of liquid at each outlet of divided liquid if need arises.

FIG. 5 is the cross sectional view illustrating another example of the liquid dividing method and apparatus of the present invention. The liquid dividing unit 11 can be separated from the main body of liquid dividing apparatus 1 of the present invention and is contacting to die lip 9 of the main body of liquid dividing apparatus 1 of the present invention.

In this case, since the liquid dividing unit 11 has a built-in partition device for liquid and separated from the main body of die 1, the number of dividing or the distance of partition device for liquid can be easily changed so that the flowing quantity of resin material at the outlet of divided liquid can be change voluntarily.

Further, in this case, the liquid dividing unit 11 is separated from the main body, and it is possible to divide the flowing liquid apart from the outlet of the main body of die 1, and this method is also within the limit of the scope of the present invention.

As the resin material, which is in liquid state or semisolid state, usable for the resin form of the present invention, following resins can be mentioned. Namely, resin composition consisting of non-reactive thermoplastic resin such as vinyl chloride or vinyl acetate and a plasticizer, polycondensable and reactive resin material such as phenol resin, melamine resin or urea resin, reactive resin material such as polyurethane resin, epoxy resin, rubber or silicone resin, latex resin material such as rubber composition, rubber latex, acryl latex or polyurethane latex, thermoplastic resin material such as thermoplastic urethane, polyethylene, polypropylene, vinyl chloride, thermoplastic rubber and rubber can be mentioned.

These resin materials can be an ordinary resin form or also can be a resin foam containing a foaming agent.

As the resin foam of the present invention, flexible foam such as polyurethane foam, soft vinyl chloride foam, silicone foam, latex rubber foam or acrylic resin foam and a hard resin foam such as hard polyurethane foam, hard phenol resin foam, hard vinyl chloride resin foam or melamine resin foam can be produced. That is, at the use of the dividing apparatus of the present invention, when the state of material for resin foam is liquid or semi-solid with liquidity at the heated condition, the resin foam is within the limit of the scope of the present invention, irrespective of whether the product is hard or soft.

Since the residing time of the dividing apparatus is very short, the dividing apparatus for liquid of the present invention is most suited to the thermosetting resin.

Substantially, in the present invention, the resin material is divided to plural pieces by the dividing apparatus for liquid, after that, said divided liquid are discharged on an adherend and left for solidify. As the adherend, a short board e.g. base plate, iron board or slate board which is provided continuously, sheet substrate which is fed continuously or endless belt can be mentioned. As the concrete example of sheet substrate, flat film or sheet, processed flat film or sheet to groove shape can be mentioned. And as the concrete example of the endless belt, conveyer belt or belt with groove can be mentioned. Although the surface of these adherents can be used as is, it can be treated by a releasing agent such as silicone resin.

As the concrete example for producing method of resin form using the dividing apparatus for liquid following methods can be mentioned. For example, a method to coat resin material on a releasable substrate such as releasing paper and to solidify it, a method to coat resin material on a substrate such as cloth or film and to solidify it or a method to coat resin material on a kind of product and to solidify it can be mentioned. Further, as the actual method to insert the starting material into groove shaped mold, a method to pour starting material continuously into V shaped groove and solidify it can be mentioned. For example, plural oblong shaped roller papers or films are drawn out as the groove shaped mold of U or V shape and then starting material is inserted into it. Or, plural groove shape molds are prepared continuously from one sheet drawn out continuously, and starting material is poured into said groove shape mold, then resin form is produced.

The adherent used in the present invention can be used alone or can be used together with other materials. Concretely, as a sole sheet substrate, kraft paper, polyethylene film, polypropylene film, polymethylpenten film, polyester film, polyamide film, polyimide film, Teflon film, fiber, woven fabric and non-woven fabric can be mentioned, however, not intended to be limit to these substances.

And, as the example of a complex sheet substrate, releasing paper to which releasing resin such as silicone resin is fused, combined sheet of releasable resin e.g. polymethylpenten resin with paper or other film, oil or surface active agent treated paper or glass fiber reinforced sheet can be mentioned, and can be voluntarily selected concerning physical features of resin and sheet substrate.

In the case when the sheet substrate is a complex paper with other material, the desirable unit weight of it is from 30 $g/m^2$ to 150 $g/m^2$.

It is desirable to use a sheet substrate repeatable as an endless belt. In the case to produce an aimed resin form itself, it is desirable to select a sheet substrate which has releasing feature. And in the case to produce combined form with a sheet substrate, it is desirable to select paper, woven fabric, non-woven fabric or film which does not have releasing feature and has good adhering ability.

As the another embodiment of the present invention, the present invention can produce plural string shape resin forms at one time using one sheet substrate which is fed continuously.

As the $1^{st}$ process, a sheet substrate is fed continuously, and make progress said fed sheet substrate along with plural radial forming guides which constrict to the progressing direction, and bend the sheet substrate between neighboring radial forming guides cubically using radial forming guide so as to form a sheet consisting of plural groove shaped forms. While forming said sheet or after forming said sheet, the $2^{nd}$ process is continued.

Namely, resin composition is poured into said plural groove shaped forms, and plural rope shaped resin foams can be produced at one time continuously.

Further, the concrete method to form above mentioned sheet composed of glove shaped form will be illustrated below.

As the $1^{st}$ process, a sheet substrate which is fed continuously is arranged along with plural radial forming guides constricting to the progressing direction, and make the sheet substrate on the radial forming guide progress over the radial forming guide. And, simultaneously, the sheet substrate located between neighboring radial forming guides is progressed through the radial forming guide as a supporter so as to form groove shape, and cubically bended. Thus the sheet consisting of plural groove shaped forms is prepared.

In this case, the sheet substrate located between neighboring radial forming guides is pressed by the radial forming guides and the sheet consisting of plural groove shaped forms is prepared.

As the other example, the following method can be mentioned. That is, plural groove shaped forms which are bended to constrict radially are progressed along with plural parallel guides so that each groove shaped forms become almost parallel toward the direction to which the sheet of groove shape is progressing. Moreover, between neighboring radial forming guides or between neighboring parallel guides, by pressing the sheet shaped substrate through either or both, that is, radial forming guide and/or parallel guide, the sheet consisting of plural groove shaped forms can be prepared.

As the concrete method for the preparation of the resin form of the present invention, the method to pour foamable resin composition into groove shaped form during the process to prepare groove shaped form using a radial forming guide from a sheet shaped substrate composed of plural groove shaped forms can be mentioned. Moreover, the method to pour resin material after the sheet having plural groove shaped forms bent by a radial forming guide so as to be constricted radially is progressed parallel in the manner so that each groove shaped forms becomes parallel with the progressing direction of the sheet substrate can be mentioned.

That is, the case to pour resin material during the process to prepare a groove shaped form using a radial guide, or the case to prepare a groove shaped form using the $1^{st}$ step radial guide, then make the groove shaped form parallel by a parallel guide and to pour foamable resin material and to use the radial guide again, or other extendable cases can be mentioned, however, not restricted by them. To sum up, the methods to prepare a groove shaped form by using a radial guide and to pour resin material into said groove shaped form are within the scope of the present invention. Further, after the foamable resin material is poured into the groove shaped form, the case to form a foam by opening the surface of pouring hole or the case to make the pouring hole narrow so that the groove shaped form is closed up completely or incompletely, or the case to closed up the form completely or incompletely by covering with other material can be mentioned.

In the method to form a groove shaped form of the present invention, it is desirable to arrange an open space between an apparatus to feed sheet substrate continuously and a radial forming guide and/or between a radial forming guide and a parallel guide. This open space is effective because it can absorb the distortion of a sheet substrate caused at the process to prepare a groove shaped form from the sheet substrate.

The present invention is to prepare a sheet having plural groove shaped forms by progressing a sheet substrate along with plural radial forming guides which constrict to the progressing direction, and the opening angle, β of all plural radial forming guides to the parallel line of the progressing direction are smaller than 15 degree, desirably smaller than 10 degree.

If the opening angle is larger than 15 degree, the radial forming guide and both side of the sheet substrate which is forming groove shaped form becomes wrinkled, and it is difficult to obtain a sheet composed of plural uniform groove shaped forms. These phenomena can be thought because the elongation of sheet substrate is small or almost zero.

The maximum opening angle of the radial form guide indicates, β of FIG. 6, and is the angle of the outermost radial forming guide to the parallel line of the progressing direction of the sheet substrate. (a) is the crossing angles β of the radial guide with the parallel line of the progressing direction, and (b) is the angle, β formed by the line connecting parallel guide 27a and fixed object 26a and the parallel line of the progressing direction. That is, 26a and 27a, which form radial, are included in the radial guide.

A sheet having plural groove shaped forms of the present invention is the groove shaped form indicated by FIG. 7, and is the longer sheet having groove shaped forms which continue to the length direction.

The sheet having plural groove shaped forms of the present invention is concretely is a sheet substrate having from 2 to more than 10 grooves.

FIG. 7 is the cross sectional view of the sheet having plural groove shaped forms, 13 of (a) is a sheet substrate, 13a, 13b and 13c are the folding line. Further, 13 of (b) is a sheet substrate, 13d, 13e, 13f, 13g and 13h are the folding line, 13 of (c) is a sheet substrate, 13i, 13j, 13k, and 13l are the folding line and 13 of (d) is a sheet substrate, 13m, 13n and 13o are the folding line.

At the preparation of a sheet having plural groove shaped forms, the case to make a folding line previously for the easy folding, or the case not to make a folding line can be used in the present invention, however, from the view point to perform the accurate shape and dimension of sheet having plural groove shaped forms prepared from one longer sheet material and for easy processing, it is desirable to make a folding line before bending.

It is desirable to make a folding line by bending the progressing sheet substrate to easier side, whichever upper side or lower side.

As the folding line of the present invention, any kind of line which makes the sheet easy for bending can be used, however, substantially in the case when the sheet is paper or the like, it can be accomplished by marking a "scratch" or a perforation line. As the substantial method to mark a "scratch", a conventional method in the bag producing industry shown in FIG. 8 can be mentioned. That is, the method to put a sheet substrate 13 between a roll 21 with plural "male" projection 22 on it's one circumference and a roll 23 with plural "female" groove 23 on it's one circumference and to make a "scratch" can be mentioned.

In the case when the folding directions are not same, the method to use an upper and a lower roll to which "male" projection or "female" groove alone is not desirable. In this case, the method to form "female" groove and "male" projection on one roll at the preferable position and to make the "female" groove and "male" projection meet each other when an upper and a lower roller are put together and to make a "scratch" can be preferably used.

As the other method, the method to mark a dotted perforation line as shown in FIG. 9 can be mentioned. This method is to dick "discontinuous pass through breaks" like dotted line which penetrates to the reverse surface of sheet substrate. And the degree of easy folding can be adjusted by changing distance between breaks and length of a break, and further can prevent the "easy breaking" of the sheet substrate.

Ordinary, the desirable length of not broken part to the length of a pass through break is 3 to 7 times to the length of a break.

25 is a roll, 18 is a perforation line cutter processed by striking off partially and discontinuously the knife edge of a circular rotary cutter so as to provide a part not to cut the sheet substrate completely and continuously. The fed sheet substrate 13 is processed by pressing between a roll 25 and a perforation line cutter 18. And when a folding line is a perforation line, sometimes there is a problem that the resin material leaks from a perforation. Said leaking problem can be avoided by not boring perforations at the part of folding line to which resin material contacts or by boring small break from which resin material does not leak instead of boring a perforation hole.

Further, by the other method, namely, by forming "not pass through breaks" so called half cut, which does not reach to the reverse surface, above mentioned problem can be avoided.

This "not pass through breaks" can be continuous break or discontinuous break. Further, the folding line of perforation can be used together with the folding line of "scratch". These folding lines can be marked before forming of a sheet having plural groove shaped forms, or can be marked at the preparation process. From the view point that the accurate size of each groove shaped forms which compose a sheet, it is desirable to mark these folding lines at the preparation process of the sheet having plural groove shaped forms.

As the $1^{st}$ process of the present invention, a sheet substrate which is fed continuously is arranged along with a radial forming guide constricting to the progressing direction, and make the sheet substrate on the radial forming guide progress over the radial forming guide. And, simultaneously, a part of the sheet substrate located between neighboring radial forming guides are progressed through the radial forming guide as a supporter so as to form groove shape, and cubically bent, thus the sheet having plural groove shaped forms is prepared. This radial forming guide can be a fixed object or a rotary roll or a movable object such as conveyor belt, further can be a longer guide or a discontinuous guide prepared by placing shorter objects with distance.

FIG. 10 is the partial perspective view of the example.

Concretely, the radial forming guide can be a square longer pipe radial forming guide 31, a circular longer fixed metal line shape radial forming guide 32, a triangle longer pipe radial forming guide 33 or a T shaped table type radial forming guide 34, further can be a radial forming guide prepared by placing shorter square pipes or circular pipes radially with distance. The example to arrange only one shorter pipe and to act it as a radial forming guide between a parallel guide placed behind with distance is also within the scope of the present invention.

That is, although in (b) of FIG. 6, 27a, 28a and 27b, 27b are parallel guides, by the combination of the shorter fixed subject 26a with the parallel guide 27a, the shorter fixed subject 26b with the parallel guide 27b, the shorter fixed subject 26c with the parallel guide 27c, the shorter fixed subject 26d with the parallel guide 27d, the shorter fixed subject 26e with the parallel guide 27e and the shorter fixed subject 26f with the parallel guide 27f, these guides can be radial guides, and therefore these guides are within the scope of the present invention.

Further, the guide prepared by arranging rotary subjects such as disk, gear or blade radially can be used as a radial forming guide, namely, any kind of subject which regulate one sheet radially can be used.

The radial forming guide of this invention is a continuous or a discontinuous structural subject in which guides are arranged radially and straightly so as to constrict to the progressing direction, and the gap of all neighboring radial forming guides are set up to become narrower along with the progress.

The wording of "along with the radial forming guide" means that; for example, in the case when the sheet substrate runs on the radial forming guide, a point of the sheet substrate on the radial forming guide constricts by moving almost always on the radial forming guide.

Further, in the case when the sheet substrate runs under the radial forming guide, a point of the sheet substrate under the radial forming guide constricts by moving almost always under the radial forming guide.

At the $1^{st}$ process which forms a sheet consisting of plural groove shaped forms by progressing a sheet substrate along with the radial forming guide of the present invention, when the radial forming guide is horizontal, the fed sheet substrate runs on upper or lower surface of the radial forming guide. And when the radial forming guide is vertical, the fed sheet substrate progresses by contacting to the side surface of the guide.

In this case, the sheet substrate is progressed between a radial forming guide and another radial forming guide so as said sheet substrate to form groove shape by the radial forming guide.

That is, for example, in the case when the sheet substrate runs over the horizontal radial forming guide, the flat sheet substrate is progressed so as to form V shaped groove between neighboring radial forming guides and the sheet having plural groove shaped forms are prepared.

The object of the present invention can be accomplished by following methods. That is, at the $1^{st}$ process, press a part of sheet substrate locating between neighboring radial forming guides and the radial forming guide so as to form groove shape, or not pressing a sheet substrate but hold a sheet substrate between neighboring parallel guides (consequently is pressed by neighboring radial forming guides), or press a part of sheet substrate locating between neighboring radial forming guide and parallel guide so as to form groove shape so as to form groove shape together with above mentioned two methods can be used. FIG. 11 is the perspective view of the pressing device example which presses by radial forming guide and/or parallel guide.

Concretely, a method to press by a pestle shaped pressing device 35 whose edge is hemispherical, a method to press by placing a square pipe pressing device 37, 40 along with the guide, a method to vacuum the gap between neighboring radial forming guide using other pressing devices 36, 38, 39, 41, 42 or a slit shaped opening, consequently to press from the rear side, or a method to press by wind pressure can be mentioned. And it is preferable to set up a pressing device for the purpose to make the groove deeper along with the progressing of the sheet substrate.

FIG. 12 is the cross sectional view showing the relationship between a radial forming guide and a pressing device.

In the drawing, 13 is sheet substrate, 32, 34, 31 are radial forming guides and 41, 40, 36, 39 are pressing devices.

The shape of the pressing device can be basically same as to the shape of radial forming guide which meets each other between neighboring radial forming guides, however, in general, a rotatable pulley, a fixed circular pipe which is inserted between guides and meets with each other or a fixed square pipe whose three dimensional sizes of length, width and height are same.

These processes can be any kind of method, however, the pressing is carried out along with the progressing of the sheet substrate. At the methods for pressing mentioned above, for example, it is desirable to reduce the running resistance by fusing e.g. Teflon on a rotatable body or on a pipe when a need is arisen.

In general, a radial forming guide of the present invention is the symmetrical fan-shape guide which constricts along with the progressing, and one of the constricting fanshape sheet substrate divided into two halves can be used and it is also within the scope of the present invention.

The present invention is to prepare a sheet having plural groove shaped forms by bending a sheet substrate along with a radial forming guide, therefore, one fed sheet substrate constricts like fan-shape. In front of this radial forming guide, that is, between the fed sheet substrate and a radial forming guide, it is desirable to set up a transformable open space.

By setting up this open space, it is possible to absorb "wrinkles" and "distortion" which generate at the beginning of bending of the sheet substrate by the radial forming guide. This can be illustrated as follows; that is, the dimensional difference between center part of sheet substrate and oblique side part of sheet substrate while being formed, which is caused by constricting of the sheet substrate to the radial forming guide, is absorbed to the open space.

In this case, since the length of center part of the sheet substrate while being formed is shorter than the length of oblique side part of sheet substrate while being formed, the center part becomes baggy and to have idle space. Said open space can be transformed selfishly without weighting forth, or can be transformed to one certain direction by weighting force partially from upper side or bottom side.

As the method to weight forth following methods following methods can be mentioned. That is, a method to weight forth to the upper center part of the sheet substrate using a roll, a method to press the upper center part by wind pressure, a method to vacuum upper center part or lower center part or a method to use a curved roll or a drum shaped roll can be mentioned. Among these mentioned methods, a method to use a curved roll or a drum shaped roll are preferably used.

The length of this open space toward progressing direction is depending on the shape and number of the grooves, however, the desirable length is from 5 to 100 cm.

To the plural groove shaped forms prepared at the $1^{st}$ process of the present invention as to constrict radially, resin material can be pour into as the $2^{nd}$ process. Following case can be also mentioned, that is, after preparing a sheet substrate having grooves which are parallel to the progressing direction of the sheet substrate by progressing prepared plural groove shaped forms parallel to the progressing direction of the groove shaped form, pour resin material into.

In the latter case, it is desirable to arrange plural parallel guides so as the sheet having groove shaped forms to progress parallel.

Actually, for the purpose to progress the groove parallel, although it is desirable to arrange a parallel guide such as a belt, a roll or a square timber, however, any kinds of plural parallel guide which can make the sheet substrate run parallel.

In the case that a radial forming guide and a parallel guide are used in the $1^{st}$ process, both guides can be arranged by series, however, it is desirable to arrange transformable open space between the radial forming guide and the parallel guide. By arranging this open space, the "distortion" which is caused as follows can be absorbed. That is, the dimensional difference between center part of sheet substrate and oblique side part of sheet substrate, which is caused because sheet material constricting to fun-shape, is moving parallel, or caused by changing of progressing direction.

Although the length of this open space changes according to the number, size and depth of sheets having plural shape forms, however, ordinary it is desirable to be 5 to 100 cm. The Present Invention will be Illustrated by the Concrete Embodiment.

FIG. 13 is the front view of a series of apparatus which prepare a sheet having plural groove shaped forms and a resin form of the present invention. Kraft paper having releasing ability, which is a sheet substrate 13 is fed through a roll 14. The perforation line is marked on the sheet substrate as a break line 15 using a perforation line cutter 18.

Said sheet substrate 13 progresses on the upper surface of $1^{st}$ radial forming guide 51, 52, 53, 54, 55, 56 (reverse side against the releasing paper). Then, the $1^{st}$ pressing device, concretely 61, 62, 63, 64 and 65 presses the sheet substrate 13 from upper side to lower side at the position between the radial forming guides. The part of sheet substrate 13 located between each radial forming guides is pressed down to the lower direction and make the depth of the groove deeper when the $1^{st}$ pressing device advances along with the radial forming guide 51, 52, 53, 54, 55 and 56, thus the groove shaped form is formed. At the point that the $1^{st}$ pressing device 61, 62, 63, 64 and 65 is acting, the radial forming guide 51, 52, 53, 54, 55 and 56 are pressing sheet substrate 13 from lower direction to upper direction.

The depth of groove of $2^{nd}$ pressing device 71, 72, 73, 74 and 75 is deeper than that of the $1^{st}$ pressing device 61, 62, 63, 64 and 65.

Regarding C point of sheet substrate 13 on a radial forming guide 51 and D point of sheet substrate 1 on a radial forming guide 52, when these C and D points are progressed to C' point and D' point, the distance between C and D points becomes gradually short and becomes distance between C' point and D' point. The depth of groove of the pressing device 71 becomes deeper than that of the pressing device 61 by the corresponding amount of said shortened distance, and the groove shaped form is formed.

C and D points on radial form guide are progressed and reach to C' and D' points, and the locuses of these points pass always on the radial forming guide.

The number for arrangements of the pressing device can be voluntarily changed according to the necessity, however, in general, arranged at 2 points or sometimes arranged at 3 or 4 points.

Further, the sheet substrate 13 on which groove shaped forms are formed progresses along with the radial forming guide and constricts, then concretely advanced to the $1^{st}$ parallel guide 81, 82, 83, 84, 85 and 86 (reverse side to releasing paper) and paralleled. Among these $1^{st}$ parallel guides 81, 82, 83, 84, 85, 86, there are pressing devices for parallel part, concretely, $3^{rd}$ pressing device 91, 92, 93, 94 and 95, and the sheet substrate is pressed by these $3^{rd}$ pressing devices and a groove shaped form sheet 17 is prepared.

In said concrete embodiment, the sheet substrate is pressed by $1^{st}$ pressing device, $2^{nd}$ pressing device and $3^{rd}$ pressing device. However, the present invention can be performed by pressing by $2^{nd}$ pressing device and $3^{rd}$ pressing device without using $1^{st}$ pressing device, or by $1^{st}$ pressing device and $3^{rd}$ pressing device without using $2^{nd}$ pressing device (also in this case, consequently the part between radial guides is pressed), or only by $2^{nd}$ pressing device without using $3^{rd}$ pressing device.

Further, the forming process by radial forming guide is not restricted to one time, and can be divided to two times.

In this apparatus, the open space 19 in which a releasing paper, which is a sheet substrate 13, can be transformed is arranged between radial forming guides 51, 52, 53, 54, 55, 56 and a feed roll 14. At the process that the Kraft paper forms the groove shaped structure, the distance from the feed roll 14 to the $2^{nd}$ pressing device 71, 72, 73, 74, 75, where radial forming guide constricts, at the center part of the Kraft paper is different from that of side part of the Kraft paper. And this space acts to absorb the surplus length of the sheet substrate caused by the phenomenon that the length of center part is shorter.

At the center of this open space, a press roll 16 for open space is arranged from the upper side and push down the surplus sheet substrate. This press roll is arranged to stabilize the dimension of the product by setting the open space 19 to the surface side or to the reverse side of the sheet substrate 13.

FIG. 14 is the A–A' line cross sectional view of FIG. 13 and FIG. 15 is the B–B' line cross sectional view of FIG. 13.

In general, a radial forming guide is composed of guides constricting radially on one flat surface, however, in the present invention, the radial forming guide having saddle shape curved surface whose center part at feeding out part is lifted (1$^{st}$ radial guides 53 and 54 locate at the higher position than the position of 51, 52, 55 and 56), can be used.

FIG. 13 is illustrating along with the progressing direction the method to produce plural rope shaped forms at one time. Resin material is continuously poured into a sheet having groove shaped form prepared at 17 and solidified.

The groove shaped form 17 is progressed through small radial guide of groove shape (not shown in this drawing) and 4$^{th}$ pressing device 101, 102, 103, 104 and 105 making the width of groove shaped form 17 narrower. Using the liquid dividing apparatus of the present invention, resin material is poured into each groove shaped form at the each outlet of divided liquid 111, 112, 113, 114, 115 of pouring device 100 for resin material. The upper opening of the groove shaped form sheet 17 into which resin material is poured is closed by an upper closing guide for groove shaped subject 121, 122, 123, 124, 125 and 126.

Then heated during passing through a cure guide of groove shaped subject 131, 132, 133, 134, 135 and 136, and formed to have circular shape by self foaming pressure or by resin expanding forth caused by heating, and the circular resin form is produced. 141, 142, 143, 144 and 145 are a closing part of groove shaped subject.

FIG. 16 is the G–G' line cross sectional view of FIG. 13 and FIG. 17 is the H–H' line cross sectional view of FIG. 13. A circular rope shaped resin foam 3 is formed by self foaming pressure or by resin expanding forth caused by heating.

If the self foaming pressure or resin expanding forth caused by heating is small or if an oval shaped string resin foam is desired, it is possible to make pass the groove shaped form through a circular or an oval shaped heating or cooling tunnel just before the solidifying.

Further, after the product is hardened in releasing paper, the closing parts of groove shaped subject 141, 142, 143, 144 and 145 are released and opened by expanding the both ends of width direction of groove shaped form sheet. 141 is opened to releasing paper 151 and 151', which is sheet substrate, and 142 is opened to releasing paper 152 and 152'.

More over, by expanding both ends of the groove shaped form sheet, the product can be removed. 13' is the releasing paper pealed after the production of rope shaped resin foam.

In the present invention, resin material of liquid or semi-solid state is poured into plural rope shaped forms while forming said plural rope shaped forms or after plural rope shaped forms are formed, and the resin form is produced.

In general, according to the conventional art, the continuous production of plural rope shaped resin forms is carried out by pouring resin material into plural metal molds, however, by said method using metal mold, it is difficult to produce a longer product continuously.

By the present invention, plural rope shaped resin forms can be produce continuously at one time without using an expensive mold.

In the present invention, resin material is poured into a groove shaped form, and the poured resin material is formed gradually by self reaction and/or by heating. Especially, when the resin is foamable resin material, by contacting both upper surface edge of each groove shaped form, the foamable resin material composition fills up the inside of closed groove shaped form and the groove shaped form becomes circular.

And, since excess foamable resin material composition overflows from the gap of the closed groove shaped form, a circular rope shaped resin foam which has a constant diameter can be easily obtained.

And, when the resin is thermoplastic resin, the inside of groove shaped form can be filled up by making narrow and contacting two ends of upper surface of groove shaped form.

Further, it is possible to put another releasing paper on the resin just before the hardening of the resin, and by this action it is possible to produce a semi-circular resin form. Furthermore, it is possible to produce any kind of different shaped form by contacting various shaped of device which is heated, cooled or of room temperature. Still further, it is also possible to produce semi-circular rope shaped resin form by coating and solidifying plural number of high viscosity or viscoelastic material on a simple releasing paper at one time.

In the present invention, the foamable resin composition having fluidity is continuously poured into a sheet having plural groove shaped forms while said sheet is being prepared or after prepared, foamed and hardened. As the one example, in the case when the resin material having fluidity is polyurethane foamable material, it is not necessary that the resin material having fluidity is a specific resin material.

As polyol, any kind of polyol which is generally used to the conventional polyurethane foam can be used, and as the concrete example, polyoxyalkylenepolyetherpolyol, polyesterpolyol, polyolefinpolyol can be mentioned.

As polyisocyanate, any kind of polyisocyanate which is generally used to the conventional polyurethane foam can be used, and as the concrete example, tolylenediisocyanate, hexamethylenediisocyanate, polymethylenepolyphenylenepolyisocyanate and crude polymethylenepolyphenylenepolyisocyanate can be used.

As a crosslinking agent or an chain extending agent, low molecular weight polyol such as 1,4butanediol, trimethylolpropane, butanediol, ethyleneglycol or diethyleneglycol or conventional polyamine such as methylenebisdiphenylpolyamine or tolylenediamine can be used.

As an foaming agent conventional foaming agent such as water, furones, organic solvent of lower boiling point or $CO_2$ can be used.

As a surface active agent, conventional silicone surface active agent such as polydimethylsiloxane-polyoxyalkyleneglycol copolymer can be desirably used, and also non-silicone surface active agent can be used alone or together with.

As a catalyst, any kind of conventionally used catalyst such as tertiary amine or organic metal compound can be used.

Further, in the present invention, an one shot method or a prepolymer method which previously react polyol with polyisocyanate can be used.

More over, in the rope shaped resin foam of the present invention, urea bond can be generally contained besides urethane bond, further isocyanurate bond can be contained.

In the present invention, both soft urethane foam and rigid urethane foam can be used and both are within the limit of the scope of the present invention.

In the present invention, a filler which is conventionally used such as inorganic filler e.g. calcium carbonate, clay, vanadium sulfate, barium hydroxide or aluminum hydroxide, dioctylphthalate, petroleum resin, asphalt or polybutene can be used.

Function

The one important point of the present invention is to produce a resin form by arranging a partition device for liquid in back of the die land of a coat hanger type die, introducing resin material of liquid or semi-solid state into said coat hanger type die and dividing it into plural number, then discharging the divided liquid on a sheet substrate and solidifying.

By arranging above mentioned partition device on the coat hanger type die, the residence times of the liquid from the inlet for resin material to each outlet of divided liquids can be adjusted almost equally maintaining the residence time remarkably short, further the discharge amount from each outlets can be adjusted equally or can be voluntarily adjusted. Further, plural resin forms can be stably produced at one time by introducing the resin of liquid or semi-solid state into the dividing apparatus of said coat hanger type die of the present invention, then discharging and solidifying said divided liquid. Thus the inventors of the present invention have accomplished the present invention.

As the ordinary and conventional method to divide liquid continuously, the methods shown in FIGS. 18, 19 and 20 are used. However, by the method shown in FIG. 18, the residing time and the discharge amount of resin from inlet 1 for resin material to each outlet of the divided liquid are not constant, namely, the residing time of the outer side becomes longer than that of inner side, and the discharge amount of the outer side becomes smaller than that of inner side. Even if the diameter of each outlet of the divided liquid 45a, 45b, 45c and 45d are changed aiming to adjust the discharge amount equal, since said change effects largely to the flowing rate of other pipes, the achievement of said aim is very difficult, further the residing time can not be adjusted equally. In the case of the method shown in FIG. 19, when the dividing number becomes large, it becomes necessary to diverge many times. Therefore the residing times become different and becomes longer. And it is also difficult to adjust the discharge amount at each outlet of the divided liquid equally, by same reason mentioned above. The method of FIG. 20 is to adjust the discharge amount equally by controlling a quantitative pomp arranged at each branch. This method is based on the balance of 4 pumps 46a, 46b, 46c and 46d. When the flow rate of one pump is changed, the flow rate of other pumps change, therefore, it is very difficult to adjust the discharge amount equally, further, since this method lacks stability, it is difficult to continue to discharge certain amount for long time.

Further, by this mentioned method, it is impossible to adjust the residing time from the liquid inlet to each outlet of divided liquid equally, and the residing time becomes longer because pumps are used.

Although not shown in drawings, there is a method to divide one pipe to plural pipes at one point. However, in this method there is a limitation in the dividing number of pipes from the physical view point, and this method is based on the balance of the divided pipes. Therefore, even if it is possible to adjust the residing time of each divided pipe equally, it is very difficult to adjust the divided amount equally and also it is difficult to maintain a balanced condition for long time.

In the dividing method of the present invention, the resin material which passes through a manifold and reaches to the border line of die land and die lip by using a coat hanger type die, spreads to the whole width of die and flows parallel toward the die outlet, and the quantity and the residing time can be made almost equal to the whole width direction of die. The discharge amount of resin material at each outlet of divided liquid can be voluntarily adjusted by arranging a partition device voluntarily to the resin material which has equal discharge amount and equal residing time maintaining short residing time, without affecting to the divided liquid of other part and without making dead angle.

Further, by arranging the number of the partition device voluntarily, the number of dividing liquid can be voluntarily changed. By using the dividing apparatus of the present invention, the resin material of liquid or semi-solid state can be divided, discharged and solidified. Thus the present invention is accomplished. By the dividing apparatus of the present invention, the liquid can be divided to several, several ten or several hundred. The present invention is quite different from the conventional liquid dividing method that to divide the liquid flowing in one pipe to plural directly. In the present invention, the liquid is converted to a film shape or plate shape rectified liquid flow of constant flow rate spread to the width direction using coat hanger type die then divided by a partition device. Namely, the present invention has a special feature in two step process.

By the present invention, even if the number of partition device is increased, the dividing of liquid by equal residing time is possible without increasing residing time, further, it is also possible to divide the liquid so as to have various different discharging amount with the equal residing time by altering the gap of partition device. Concretely, in FIG. 2, by altering the gap of partition device 6a, 6b, 6c, 6d and 6e, the discharging amount at each outlet of divided liquid can be voluntarily altered, further by altering the number of the partition devices, the number of divided liquids can be voluntarily altered.

According to the present invention, especially the dividing of liquid by same or different discharging amount in short and same residing time is possible. Therefore, the present invention is suited for the liquid dividing of the early reactive or easy solidifying resin material, and can discharge the divided liquid on sheet substrate and can solidify.

Still more, it is possible to produce a resin form by using the liquid dividing apparatus of the present invention by the process mentioned below. Namely, plural blocks of resin are discharged on various kind of sheet substrate and coated, then physical treatment, e.g. cooling or heating action, is carried out to solidify the resin physically or chemically, and the resin form can be produced.

Further, by the present invention, it is possible to produce a resin form by following process. That is, plural groove shaped forms are formed on one sheet substrate which is fed continuously, and above mentioned plural liquid or semi-solid state resin materials which are divided plural into said groove shaped forms, then resin forms can be prepared.

Basically, the present invention is to prepare a sheet having plural groove shaped forms continuously by feeding a sheet substrate which is wound roll, make progress said sheet substrate along with a radial forming guide consisting of plural guides and simultaneously press the sheet substrate located between radial forming guides, or press the sheet substrate by parallel guide, or by pressing the sheet substrate between neighboring two guides.

The part of sheet substrate locating between the radial forming guide and neighboring radial forming guide is pressed so as to make the depth of groove deeper, and the width of groove becomes narrower by progressing along with the radial forming guide.

Therefore, in the present invention, a point on sheet substrate on radial forming guide draws the locus moving almost always on the radial forming guide and constricting.

The reason why the wording of "draws the locus moving almost always on the radial forming guide and constricting" is used is illustrated as follows. That is, since the length of center part of sheet substrate which progresses on radial forming guide and the length of outermost side becomes different and causes dimensional difference "slack", a point on sheet substrate gets slightly out of the guide.

However, by constricting along with the radial forming guide, a point on the guide becomes basically to pass the locus on the guide. Points of sheet substrate on plural neighboring radial forming guide comes closer by transferring, and groove becomes deeper, and thus plural groove shaped forms are formed on one sheet substrate.

This function is same, even if a complete radial forming guide is used, or a ½ shaped radial forming guide which is divided parallel into two halves along with the progressing direction of the radial forming guide is used.

EXAMPLES

Example 1

Using the apparatus shown in FIG. 13, a sheet having plural groove shaped forms is formed as the $1^{st}$ process, then the $2^{nd}$ process the starting material for foamable polyurethane is poured using the apparatus of the present invention of FIG. 1, and the rope shaped resin form is produced.

The specifications of main apparatuses for producing groove shaped form sheet are mentioned below.
1. Width of feed roll 10:1000 mm
2. Width of releasing paper: 700 mm
3. Dimension of each radial forming guide (51, 52, 53, 54, 55, 56): width 25 mm, height 30 mm, length 3000 mm
4. Open space 19 between feed roll 14 and radial forming guide (51, 52, 53, 54, 55, 56): approximately 350 mm
5. Open space 12 between $1^{st}$ radial forming guide (51, 52, 53, 54, 55, 56) and $1^{st}$ parallel guide (81, 82, 83, 84, 85, 86): approximately 300 mm
6. Dimension of $1^{st}$ parallel guide (81, 82, 83, 84, 85, 86): width 25 mm, height 30 mm, length 660 mm
7. Distance between C point and D point on neighboring $1^{st}$ radial forming guides (51, 52): 70 mm
8. Distance between C' point and D' point on neighboring $1^{st}$ radial forming guides (51, 52): 25 mm
9. Distance between E point and F point on neighboring $1^{st}$ parallel guides (81, 82): 25 mm
10. Distance between E' point and F' point on neighboring 1st parallel guides (81, 82): 25 mm
11. Opening angle of $1^{st}$ radial forming guide β: approximately 2.15 degree
12. $1^{st}$ pressing device: Teflon tape adhered aluminum square timber of 40 mm×40mm×160 mm
13. $2^{nd}$ pressing device: Teflon tape adhered aluminum square timber of 28 mm×28 mm×160 mm
14. $3^{rd}$ pressing device: Teflon tape adhered aluminum square timber of 20 mm×20 mm×500 mm Silicon releasing paper of 700 mm width and 200 g unit weight is fed out by feeding speed of 20 m/min according to FIG. 13. However, the number of groove shaped forms is not 5 but 6.

At the point when width becomes 7 mm and depth becomes 30 mm, foamable polyurethane materials of blending recipe mentioned below are stirred and mixed using a small foaming machine and is poured into grooves by dividing continuously by the liquid dividing apparatus of the present invention shown by the drawing. The liquid dividing apparatus used in this Example is the apparatus of 200 mm width, the ratio of the inner volume except manifold and the inner volume of manifold is 1:0.21, opening angle of the resin material introducing inlet is approximately 128 degree and number of dividing is 6.

In this case, the amount of foaming catalyst is not reduced, further the temperature of material is set up to normal temperature of 25° C. and the reaction of foamable polyurethane material is not controlled at all.

Each groove shaped forms in which foamable polyurethane composition is poured are further passed through $2^{nd}$ radial forming guide, and the width of groove becomes narrower. At the process to foam and solidify the rope shaped polyurethane foam, the releasing paper is heated to the temperature of 45° C., and after foamable polyurethane composition is poured the temperature is further elevated to 75° C., more over, after the foaming reaction is over, the temperature is elevated to 100° C. The obtained rope shaped polyurethane foam is a circular rope shaped polyurethane foam of 15 mm diameter.

The physical properties of the obtained rope shaped polyurethane foam are, density is 0.085 g/cm$^3$, and tensile strength is 0, 12 Mpa.

Starting Materials for Polyurethane Foam
(1) Polyether of molecular weight 3000 prepared by addition polymerization reaction of propyleneoxide to glycerin: 100 wt %.
(2) Tolylene diisocyanete (T-80): 39.6 wt %.
(3) H$_2$O: 3.0 wt %
(4) Silicone surface active agent F-242T (product of Shin-Etsu Chemical Industries): 1.5 wt %.
(5) Triethylenediamine DABCO33LV (product of Sankyo Air Products): 0.20 wt %
(6) Stannous octoate: 0.33 wt %

Example 2

Rope shaped soft polyvinylchrolide foam is produced using same apparatus to Example 1.

As the releasable sheet substrate, the releasing paper of 85 g/m$^2$ unit weight whose surface is previously treated by clay, then silicone removing agent is coated directly and after that, is baked.

Said releasing paper is progressed by 1 m/min. speed and sheet 17 having groove shaped forms is prepared by the apparatus shown in FIG. 13.

After the foamable polyvinylchrolide composition mentioned below is mixed by a high speed mixing machine, introduced into a liquid dividing device of the present invention and divided to 6, then poured into prepared sheet 17 having groove shaped forms.

While, the liquid dividing apparatus used in this Example is the apparatus of 200 mm width, the ratio of the inner volume except manifold and the inner volume of manifold is 1:0.22, opening angle of the resin material introducing inlet is approximately 128 degree and number of dividing is 6.

The groove shaped forming sheet in which the resin material is introduced is heated to the temperature of approximately 145 so as to foam, then the temperature is elevated to 190 and plasticized sufficiently, cooled down and removed.

Foamable Polyvinylchrolide Composition
Paste type polyvinylchloride: 100 wt. parts
Dioctylphthalate: 100 wt. parts
Calcium carbonate: 10 wt. parts
ADKSTAB OF-14 (product of Asahi Denka Industries): 3 wt. parts
ADKSTAB BAP-1 (product of Asahi Denka Industries): 3 wt. parts
Azodicarbone amide: 13 wt. parts The obtained rope shaped foam is a foam of 0.10 g/cm$^3$ density and soft.

Example 3
Starting Material for Polyurethane Foam
(1) Polyetherpolyol of molecular weight 3000 prepared by addition polymerization reaction of propyleneoxide to glycerin: 100 wt %
(2) Tolylene diisocyanete (T-80): 39.6 wt %
(3) $H_2O$:3.0 wt %
(4) Carbonic acid gas: 1.452 wt %
(5) Silicone surface active agent F-242T (product of Shin-Etsu Chemical Industries): 1.5 wt %
(6) Triethylenediamine DABCO33LV (product of Sankyo Air Products): 0.2 wt %
(7) Stannous octate: 0.33 wt %
Liquid Dividing Apparatus
(1) Width: 200 mm
(2) Ratio of the inner volume except manifold/inner volume of manifold: 1:0.21
(3) Opening angle of the resin material introducing inlet: approximately 128 degree
(4) Number for dividing: 12

The same releasing paper to Example 1 of 400 mm width is fed out.

Above mentioned foamable polyurethane material is divided to 12 by the liquid dividing apparatus of the present invention and coated on said silicone releasing paper. The coated rope shaped polyurethane is introduced into a foaming oven of 80, then transferred to a cure oven of 100 and removed. The obtained rope shaped polyurethane foam is a foam of 6.5 mm half circular shape and the physical properties of it are, density is 0.11 $g/cm^3$, and tensile strength is 0, 11 Mpa.

POSSIBILITY OF THE INDUSTRIAL APPLICATION

Usually, although the maximum dividing number of resin material was two, the present invention makes it possible to increase the dividing number of resin material from several to several tens. And, by the present invention, not only the huge cost for equipment caused by using plural equipments can be remarkably reduced, but also the liquid dividing of reactive resin material becomes possible without gelling, which was impossible by the conventional dividing apparatus, further make it possible to produce plural resin forms at one time.

What is claimed is:

1. A method for producing a resin form comprising,
    arranging a partition device for liquid to a die land and/or a die lip of a coat hanger type die placed on the die land and on the die lip parallel with a line connecting a liquid inlet which is at the center of a manifold and a liquid outlet at a closest point,
    introducing a reactive starting material for resin of a liquid or semi-solid state continuously into said coat hanger type die, spreading said reactive starting material for resin of liquid or semi-solid state to form a thin film and dividing the film of said reactive starting material for resin in liquid or semi-solid state into plural streams by said partition device for liquid, then discharging and solidifying said divided reactive starting material for resin of liquid or semi-solid state divided into plural streams on an adherent.

2. The method for producing resin form of claim 1 wherein reactive resin form is urethane resin, silicone resin or epoxy resin.

3. The method for producing resin form according to claim 2, wherein the reactive resin form is a foamed object.

4. The method for producing reactive resin form according to claim 3, wherein the divided liquids are discharged into plural groove shaped forms continuously and solidified.

5. The method for producing reactive resin form according to claim 2, wherein the divided liquids are discharged into plural groove shaped forms continuously and solidified.

6. The method for producing a resin form according to claim 2, further comprising,
    feeding a sheet substrate continuously,
    making the fed sheet substrate arrange along with a radial forming guide constricting to the progressing direction,
    making the sheet substrate on the radial forming guide progress over the radial forming guide,
    and simultaneously processing a sheet substrate to one sheet having plural groove shaped forms by cubically bending the sheet substrate located between neighboring radial forming guides by the radial forming guide,
    after that, arranging a partition device for liquid to a die land and/or a die lip of a coat hanger type die placed on the die land and on the die lip parallel with a line connecting a liquid inlet which is at the center of a manifold and a liquid outlet at a closest point,
    introducing a reactive starting material for resin of a liquid or semi-solid state continuously into said coat hanger type die, spreading said reactive starting material for resin of liquid or semi-solid state to form a thin film and dividing the film of said reactive starting material for resin in liquid or semi-solid state into plural streams by said partition device for liquid,
    then discharging and solidifying said divided reactive starting material for resin of liquid or semi-solid state divided into plural streams on an adherent.

7. The method for producing resin form according to claim 1, wherein the reactive resin form is a foamed object.

8. The method for producing reactive resin form according to claim 7, wherein the divided liquids are discharged into plural groove shaped forms continuously and solidified.

9. The method for producing a resin form according to claim 7 further comprising,
    feeding a sheet substrate continuously,
    making the fed sheet substrate arrange along with a radial forming guide constricting to the progressing direction,
    making the sheet substrate on the radial forming guide progress over the radial forming guide,
    and simultaneously processing a sheet substrate to one sheet having plural groove shaped forms by cubically bending the sheet substrate located between neighboring radial forming guides by the radial forming guide,
    after that, arranging a partition device for liquid to a die land and/or a die lip of a coat hanger type die placed on the die land and on the die lip parallel with a line connecting a liquid inlet which is at the center of a manifold and a liquid outlet at a closest point,
    introducing a reactive starting material for resin of a liquid or semi-solid state continuously into said coat hanger type die, spreading said reactive starting material for resin of liquid or semi-solid state to form a thin film and dividing the film of said reactive starting material for resin in liquid or semi-solid state into plural streams by said partition device for liquid,
    then discharging and solidifying said divided reactive starting material for resin of liquid or semi-solid state divided into plural streams on an adherent.

10. The method for producing reactive resin form of claim 1, wherein the adherend is a sheet substrate.

11. The method for producing reactive resin form of claim 10, wherein the sheet substrate is Kraft paper, polyethylene film, polypropylene film, polymethylpenten film, polyester film, polyamide film, polyimide film, Teflon film, woven cloth, non-woven cloth, releasing paper or releasing film.

12. The method for producing reactive resin form according to claim 1 wherein the divided liquids are discharged into plural groove shaped forms continuously and solidified.

13. A method for producing a resin form comprising, feeding a sheet substrate continuously, making the fed sheet substrate arrange along with a radial forming guide constricting to the progressing direction, making the sheet substrate on the radial forming guide progress over the radial forming guide, and simultaneously processing a sheet substrate to one sheet having plural groove shaped forms by cubically bending the sheet substrate located between neighboring radial forming guides by the radial forming guide, after that, arranging a partition device for liquid to a die land and/or a die lip of a coat hanger type die placed on the die land and on the die lip parallel with a line connecting a liquid inlet which is at the center of a manifold and a liquid outlet at a closest point, introducing a reactive starting material for resin of a liquid or semi-solid state continuously into said coat hanger type die, spreading said reactive starting material for resin of liquid or semi-solid state to form a thin film and dividing the film of said reactive starting material for resin in liquid or semi-solid state into plural streams by said partition device for liquid, then discharging and solidifying said divided reactive starting material for resin of liquid or semi-solid state divided into plural streams on an adherent.

* * * * *